OR 4,021,100

United States Patent
Giglia

[11] 4,021,100
[45] May 3, 1977

[54] ELECTROCHROMIC DEVICE HAVING AN ELECTROLYTE CONTAINED IN A SOLID POROUS INSULATING LAYER

[75] Inventor: Robert Domenico Giglia, Rye, N.Y.

[73] Assignee: American Cyanamid Company, Stamford, Conn.

[22] Filed: Apr. 23, 1976

[21] Appl. No.: 679,616

Related U.S. Application Data

[63] Continuation-in-part of Ser. No. 502,584, Sept. 3, 1974, abandoned.

[52] U.S. Cl. .......................................... 350/160 R
[51] Int. Cl.² ........................................ G02F 1/28
[58] Field of Search .................................. 350/160

[56] References Cited

UNITED STATES PATENTS

| 3,807,832 | 4/1974 | Castellion | 350/160 R |
| 3,839,857 | 10/1974 | Berets et al. | 350/160 R |
| 3,843,232 | 10/1974 | Berets | 350/160 R |
| 3,944,333 | 3/1976 | Leibowitz | 350/160 R |

*Primary Examiner*—William L. Sikes
*Attorney, Agent, or Firm*—Robert J. Feltovic

[57] ABSTRACT

An electrochromic data display and light modulating device which may be formed by sandwich arrangement of the imaging or light modulating layer and the counter-electrode layer, with a suitable porous insulating layer between, and an electrolyte permeating the porous insulating layer.

7 Claims, 2 Drawing Figures

ELECTROCHROMIC DEVICE HAVING AN ELECTROLYTE CONTAINED IN A SOLID POROUS INSULATING LAYER

This is a continuation-in-part of U.S. Patent application Ser. No. 502,584, filed Sept. 3, 1974, and now abandoned.

BACKGROUND OF INVENTION

This invention relates to electro-optical devices whose electromagnetic radiation absorption characteristics can be selectively altered by influence of a suitably controlled electric field. More particularly, this invention is directed to a sandwich type cell in which a layer of electrochromic material is separated by a solid, porous insulating layer from a porous counter-electrode, wherein the insulating layer is wetted with an acid electrolyte.

In U.S. Pat. Nos. 3,521,941, 3,578,843, 3,704,057 and 3,708,220, there are described electro-optical devices exhibiting a phenomenon known as persistent electrochromism wherein electromagnetic radiation absorption characteristic of a persistent electrochromic material is altered under the influence of an electric field. Such devices were employed in sandwich arrangement between two electrodes. Coloration was induced by charging the electrochromic film negative with respect to the counter-electrode, employing an external potential. The counter-electrode can be the same as the persistent electrochromic material or different.

By reversing the original polarity of the field or by applying a new field, it was also possible to cancel, erase or bleach the visible coloration.

These steps of color induction and erasure are defined as cycling.

Although the devices described in the prior applications are effective to change their electromagnetic radiation transmitting properties under the influence of an electric field, and have good operability, they include certain inherent deficiencies which tend to reduce their long-term cycle life and limit their switching speed.

It is therefore an object of this invention to provide an electrochromic light modulating device which has a faster switching speed.

A further object is to provide an electrochromic light modulating device with extended cycle life.

These and other objects of the invention will become apparent as the description thereof proceeds.

SUMMARY OF THE INVENTION

The image display device is formed in a sandwich arrangement of an electrochromic layer as an imaging or light modulating area and a counter-electrode with a porous insulating medium between the areas which is wetted with an electrolyte. Means are provided for supplying electric current to the light modulating layer and the counter-electrode layer. Any conventional electrode means is suitable. A particularly advantageous means for electrical connection is to deposit the electrochromic light modulating layer on a conductive surface, such as NESA glass.

U.S. Pat. No. 3,521,941 discloses a solid electrochromic structure comprising a solid electrochromic film capable of cycling through a coloring mode and erased mode. These electrochromic devices include an insulating layer in order to provide continuous effective insulation against normal electrical conduction between the opposed surfaces of the electrochromic electrode and the counter-electrode. An electronic theory of operation was proposed suggesting that this insulating layer functioned by serving to impede normal electrical conduction, while, nevertheless, because of its thinness, permitting quantum mechanical tunneling of electrons. These electrons allegedly produce color centers observed as coloration of the electrochromic material.

Alternatively, proposing an ionic theory, it was suggested that the insulating layer served to block entirely the passage of electrons, but permitted the transfer through it of ions. These ions allegedly serve to produce color centers in the electrochromic layer. Devices of this type must be driven at 2 to 7 volts DC to operate at a useful switching speed. It has been determined that these devices require a small amount of water to operate. Unfortunately, at these switching voltages water is consumed giving off $H_2$ gas and/or $O_2$ gas which disrupts the overlying layers resulting in a decrease in cycle life.

Other electrochromic structures have been prepared in which an electrolyte as a liquid or paste or gel has been substituted for the solid "current carrier permeable insulator" and the counter-electrode is on a separate conductive substrate. Such electrolyte containing devices, as in U.S. Pat. No. 3,708,220, depict a further development in the electrochromic display art comprising the replacement of the earlier "insulating layer" with a semi-solid, highly conductive sulfuric acid gel electrolyte. This evidences the trend toward acceptance of the ionic theory; and, thus, this reference provides for the use of a layer which exhibits much better ionic conductivity than the insulators of the prior art. These structures operate at lower voltages, typically about 1 volt; gas evolution is eliminated or suppressed and cycle life in $10^6$ cycles is known. However it has been observed that life is still partially limited because of the slight solubility of the electrochromic film in the acid.

A gel or liquid layer is difficult to apply in a thin, regular, consistent layer; and, hence, a relatively thick layer must be employed, increasing the amount of acid present, and thus increasing the corrosion tendency of the electrochromic layer. To achieve the desired thinness of electrolyte and minimization of acid, the present invention incorporates a solid porous insulating material. The layer is composed of a solid which can be deposited in a very thin layer. This thin layer then is wetted with an electrolyte to provide a medium with good ion conductance and with a minimal amount of acid-electrolyte.

The present invention thus successfully utilizes certain advantages of both prior structures while eliminating the disadvantages of both. The structure includes the solid features of the so called "Solid Electrochromic Structure" but includes an ion carrying acid electrolyte, which permeates the solid insulating layer resulting in improved ion mobility between closely spaced electrodes thereby permits faster switching and use of lower voltages which avoid gas evolution. Also, the electrolyte may be held mainly in the porous insulating layer (capillary action) limiting the total electrolyte volume and thus reducing solubility of the electrochromic film.

This invention is expected to be useful in applications for electrochromic devices requiring long life and fast switching speeds. Elimination of an electrolyte column may make large electrochromic windows a possibility as the leakage hazard is greatly reduced with this concept.

The foregoing and other features, objects and advantages of the present invention will become more apparent from the following detailed description.

DETAILED DESCRIPTION OF INVENTION

Figure 1:
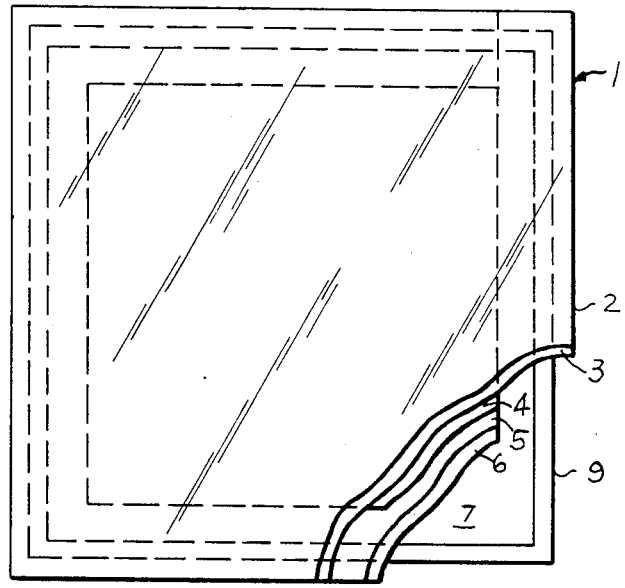

The invention consists of a transparent, conductive electrode which has deposited on it an electrochromic film, a rigid, porous insulating layer and a porous counter-electrode layer. The insulating layer-electrode structure is wetted by an acid electrolyte or other proton source and the assembly is sealed to exclude oxygen and water.

As used herein, a "persistent electrochromic material" is defined as a material responsive to the application of an electric field of a given polarity to change from a first persistent state in which it is essentially nonabsorptive of electromagnetic radiation in a given wavelength region, to a second persistent state in which it is absorptive of electromagnetic radiation in the given wavelength region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

Electrochromic Materials

The materials which form the electrochromic materials of the device in general are electrical insulators or semiconductors. Thus are excluded those metals, metal alloys, and other metal-containing compounds which are relatively good electrical conductors, as described in U.S. Pat. No. 3,704,057.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like.

A particularly advantageous aspect of the present invention is in the use of two separate layers of identical electrochromic materials, one layer being employed as the counter-electrode for the other layer. A preferred embodiment consists of tungsten oxide as the electrochromic color electrode and tungsten oxide and graphite as the counter-electrode.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compound being laid down as a film and by the film-forming method since the particular compound and film-forming method may place physical (e.g., nonuniform film surface) and economic limitations on manufacture of the devices.

The films may be laid down on any substrate which, relative to the film, is electrically conducting. The electrically conductive material may be coated on another suitable substrate material including glass, wood, paper, plastics, plaster, and the like, including transparent, translucent, opaque or other optical quality materials. A preferred embodiment in the instant device would employ at least one transparent electrode.

When tungsten oxide is employed as the electrochromic imaging material and an electrical field is applied between the electrodes, a blue coloration of the previously transparent electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer was essentially non-absorbent and thus transparent.

Electrolyte

A fluid layer containing an acid may also be used as disclosed in U.S. Pat. No. 3,704,057. A preferred embodiment employs $H_2SO_4$.

Porous Insulating Layer

The porous insulating layer may be an inorganic or other solid material as disclosed in U.S. Pat. No. 3,578,843, e.g. silicon oxide or aluminum oxide. Also contemplated is a layer of porous glass as described in Product Engineering, February 1973, page 33.

Counter-Electrode

As previously indicated, the counter-electrode may be any electrically conductive material which is light transmitting. Suitable metallic counter-electrode materials are disclosed in U.S. Pat. No. 3,704,057. Particularly good counter-electrode materials are palladium and gold. The invention may be further understood by reference to the drawings in which FIG. 1 is a front view of a light modulating device according to the invention.

Figure 2:
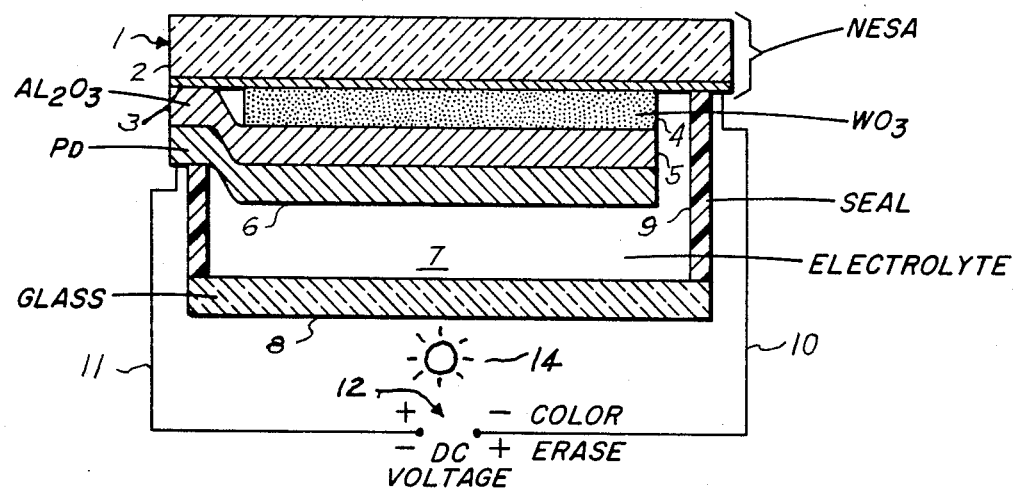

FIG. 2 is a cross section of the electrochromic display device. As shown in FIGS. 1 and 2, the light modulating device consists of a front plate 1, consisting of a transparent or translucent material 2 such as glass or plastic, with a light transmitting layer 3, which is electrically conductive, e.g. tin oxide. The structure of 2 and 3 is available commercially as NESA glass. As shown, a layer of tungsten oxide 4 is deposited upon the tin oxide 3, and the tungsten oxide 4, has deposited on it sequentially a layer of a porous insulating material 5 such as $Al_2O_3$, and on this a layer of a conductive metal 6 as a counter-electrode. A space 7 is provided to contain an acid electrolyte to wet the porous insulator 5. A non-conducting backing plate 8 and seal 9 close the device. The front electrode 1 is connected to a power source by means of connector 10, and the counter-electrode is connected to the power source by connector 11. The current modes for coloring and erasing are shown at switch 12. As illustrated, a viewer at station 13 could modulate transmission or sunlight (or other radiation) from point 14.

The device discussed and illustrated in FIGS. 1 and 2 could also operate in the reflecting mode by making the counter-electrode opaque. In this way the light to be modulated would come from the front of the device as seen by the viewer.

Moreover, an information display device could be fabricated with the structure of this invention, if the tungsten oxide layer is in the form of discrete dots or segments with the required electrical circuitry and logic means.

I claim:

1. In a variable light transmission device which comprises a conductive light transmitting substrate having a layer of a persistent electrochromic material as a light modulating material, a counter-electrode, and an ion conducting layer, an improved ion conducting layer comprising a solid layer of porous electrical insulating material as a support surface in contact with said persistent electrochromic material and said counter-electrode and an electrolyte means to permeate said support surface.

2. The variable light transmission device as in claim 1, which comprises a layered arrangement of the persistent electrochromic material and the electrolyte wetted porous insulating layer, disposed between the pair of conductive electrodes.

3. The variable light transmission device of claim 1, wherein said solid layer of porous insulating material is aluminum oxide.

4. The variable light transmission device of claim 1, wherein said solid layer of porous insulating material is silicon oxide.

5. The variable light transmission device of claim 1, wherein said solid layer of porous insulating material is porous glass.

6. The variable light transmission device of claim 1, wherein said electrolyte means is an acid solution.

7. The variable light transmission device of claim 6, wherein said electrolyte means is a sulfuric acid solution.

* * * * *